United States Patent
Di Florio et al.

(10) Patent No.: US 10,767,565 B2
(45) Date of Patent: Sep. 8, 2020

(54) SYSTEM AND METHOD FOR SEALING A FLUID SYSTEM IN A SAFETY CONDITION

(71) Applicant: PRATT & WHITNEY CANADA CORP., Longueuil (CA)

(72) Inventors: Domenico Di Florio, Saint-Lazare (CA); Eric Hosking, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 253 days.

(21) Appl. No.: 15/240,418

(22) Filed: Aug. 18, 2016

(65) Prior Publication Data

US 2018/0051634 A1 Feb. 22, 2018

(51) Int. Cl.
| | |
|---|---|
| *F02C 7/28* | (2006.01) |
| *F02C 7/25* | (2006.01) |
| *F16L 57/04* | (2006.01) |
| *F16L 21/035* | (2006.01) |
| *F02C 7/06* | (2006.01) |
| *F02C 7/22* | (2006.01) |
| *F16J 15/02* | (2006.01) |

(52) U.S. Cl.
CPC .................. *F02C 7/28* (2013.01); *F02C 7/06* (2013.01); *F02C 7/222* (2013.01); *F02C 7/25* (2013.01); *F16J 15/021* (2013.01); *F16L 21/035* (2013.01); *F16L 57/04* (2013.01); *F05D 2220/32* (2013.01); *F05D 2230/60* (2013.01); *F05D 2300/10* (2013.01)

(58) Field of Classification Search
CPC ...... F16J 15/028; F16L 21/002; F16L 21/022; F16L 21/05; F16L 21/02; F16L 21/005
See application file for complete search history.

(56) References Cited

U.S. PATENT DOCUMENTS

| | | | | | |
|---|---|---|---|---|---|
| 3,171,662 | A | * | 3/1965 | Warn | F16J 15/121 277/644 |
| 3,375,016 | A | * | 3/1968 | Jellinek | F16J 15/008 277/645 |
| 4,658,847 | A | | 4/1987 | McCrone | |
| 5,427,386 | A | * | 6/1995 | Breaker | F16J 15/008 277/608 |
| 5,433,453 | A | * | 7/1995 | Dalton | F01D 11/005 277/606 |

(Continued)

*Primary Examiner* — Kristina R Fulton
*Assistant Examiner* — L. Susmitha Koneru
(74) *Attorney, Agent, or Firm* — Norton Rose Fulright Canada LLP

(57) ABSTRACT

A system comprises a pipe defining a fluid passage, the pipe having a first rate of thermal expansion. A housing defines an opening for receiving an end of the pipe for fluid circulation between the fluid passage and an interior of the housing, the housing having a second rate of thermal expansion lesser than the first rate of thermal expansion, at least one annular gap defined between a periphery of the opening and the end of the pipe when the system is below a safety condition threshold temperature. Seal(s) seal the annular gap, wherein the pipe and the housing are configured and the first and second rates of thermal expansion are selected so that, when the system exceeds the safety condition threshold temperature, the end of the pipe contacts the periphery of the opening by thermal expansion to seal the annular gap independent of the at least one seal.

20 Claims, 3 Drawing Sheets

(56) References Cited

U.S. PATENT DOCUMENTS

| | | | |
|---|---|---|---|
| 6,302,402 B1 * | 10/2001 | Rynders | F16J 15/0806 277/530 |
| 7,581,765 B2 * | 9/2009 | Minford | F16L 23/18 285/354 |
| 8,434,999 B2 | 5/2013 | Amaral et al. | |
| 2006/0048826 A1 * | 3/2006 | Gossett | F16K 47/08 137/625.33 |
| 2011/0088918 A1 * | 4/2011 | Gonzales | A62C 2/10 169/48 |
| 2013/0068104 A1 * | 3/2013 | Brown | B01D 46/0084 96/361 |
| 2014/0327212 A1 * | 11/2014 | Lowe | F16J 15/16 277/345 |
| 2015/0108378 A1 | 4/2015 | Lovell | |

* cited by examiner

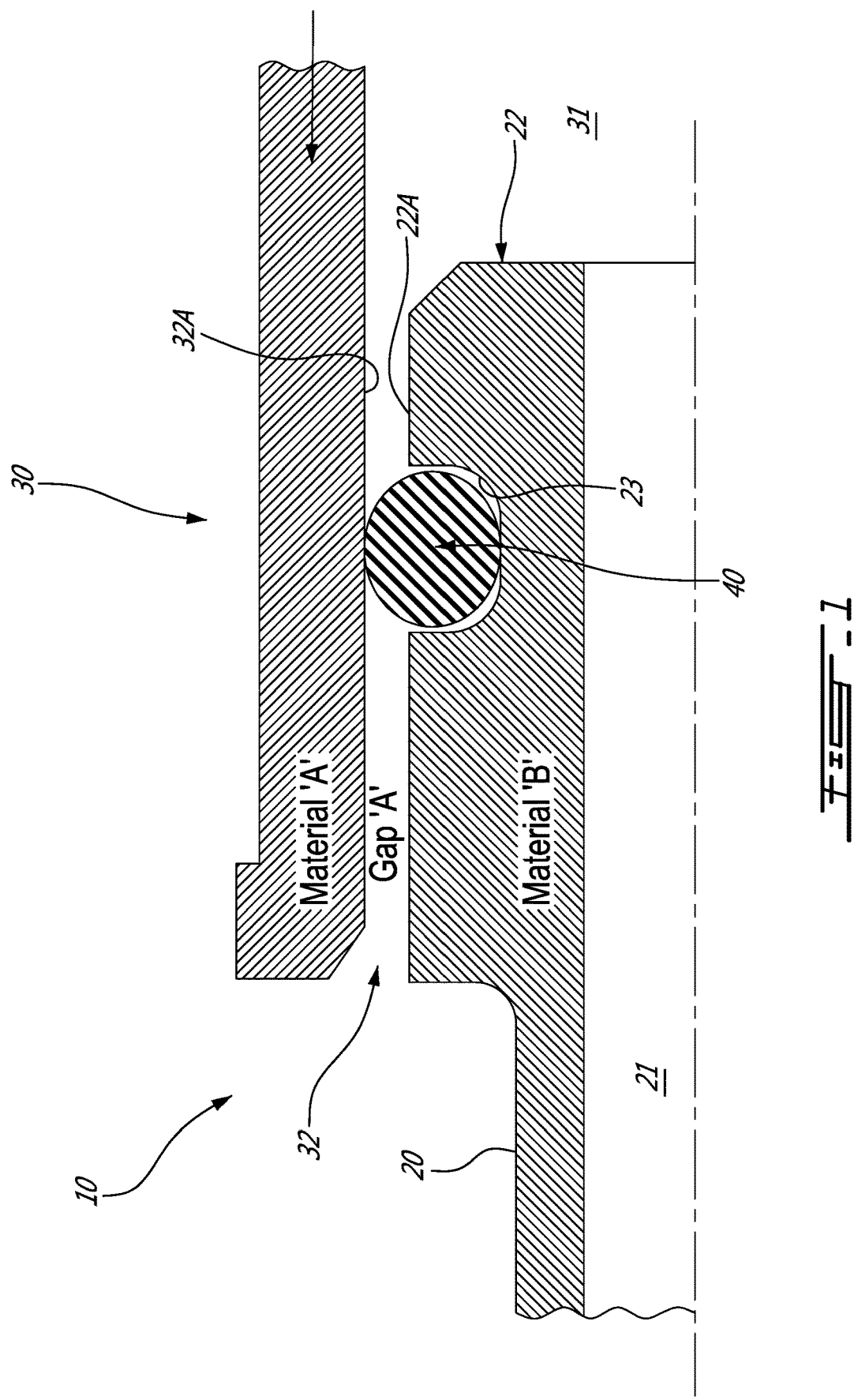

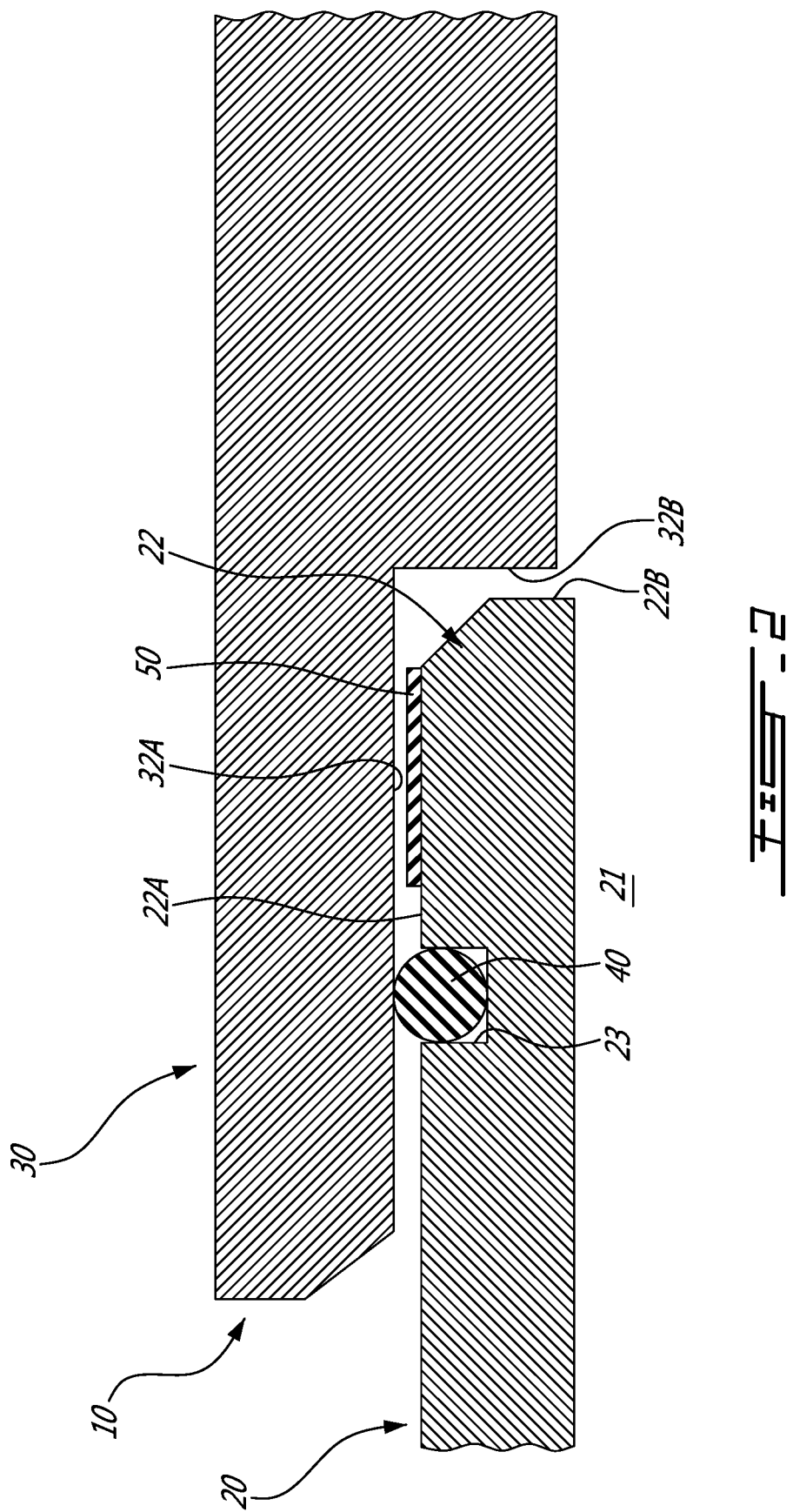

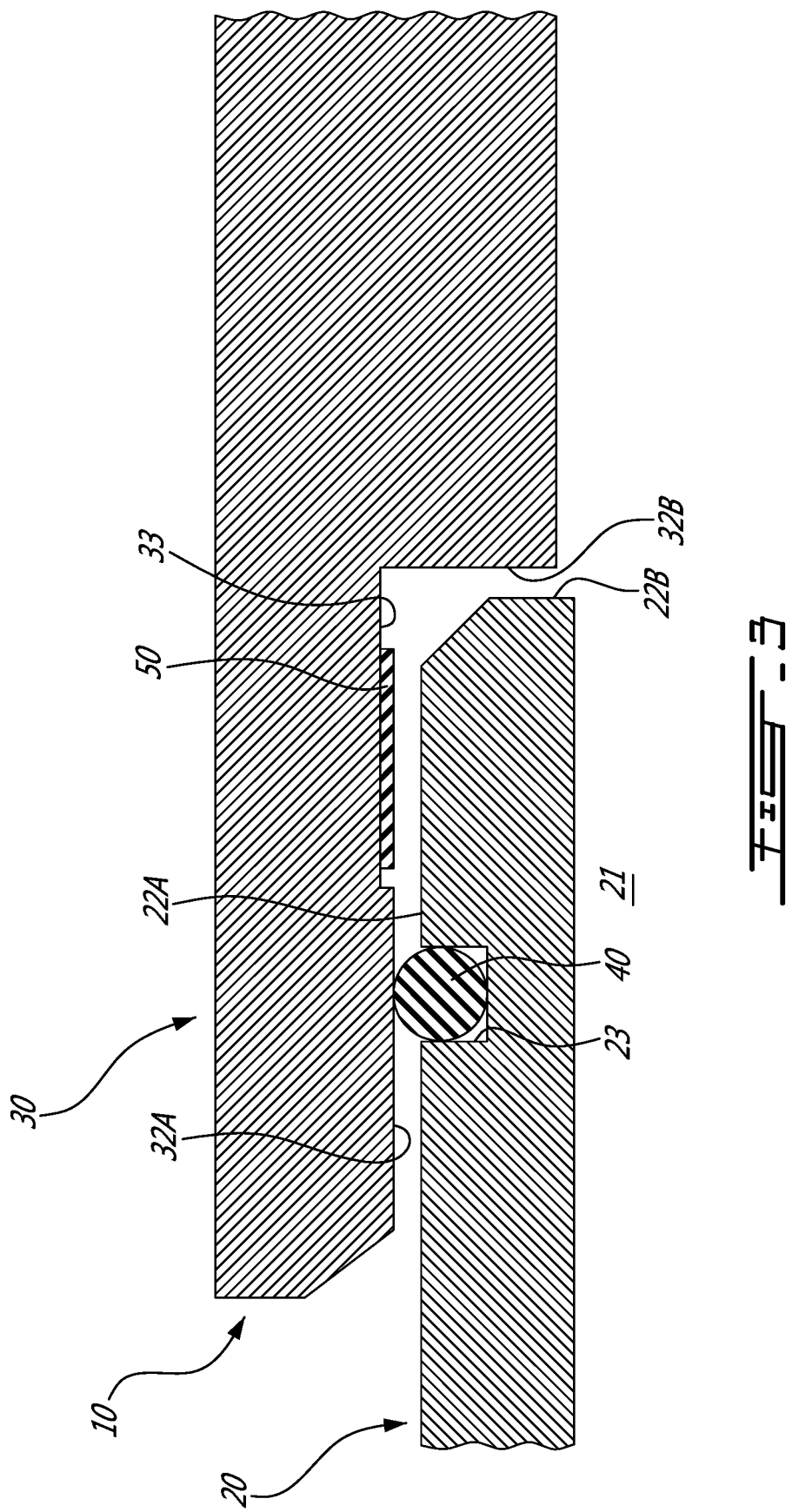

SYSTEM AND METHOD FOR SEALING A FLUID SYSTEM IN A SAFETY CONDITION

TECHNICAL FIELD

The application relates generally to sealing arrangements in engines such as gas turbine engines.

BACKGROUND OF THE ART

In engines, such as gas turbine engines, fire conditions are typically challenging for sealing interfaces. An example would be a transfer tube configuration including a transfer tube, a housing and a seal such as a preformed packing in an annular gap between the transfer tube and a tube receptacle of the housing. In the event of a fire condition, there results exposure of the seal to temperatures above those of normal operation. Such exposure may affect the integrity of the seal.

SUMMARY

In one aspect, there is provided a system comprising: a pipe defining a fluid passage, the pipe having a first rate of thermal expansion, a housing defining an opening for receiving an end of the pipe for fluid circulation between the fluid passage and an interior of the housing, the housing having a second rate of thermal expansion lesser than the first rate of thermal expansion, at least one annular gap defined between a periphery of the opening and the end of the pipe when the system is below a safety condition threshold temperature, and at least one seal sealing the annular gap, wherein the pipe and the housing are configured and the first and second rates of thermal expansion are selected so that, when the system exceeds the safety condition threshold temperature, the end of the pipe contacts the periphery of the opening by thermal expansion to seal the annular gap independent of the at least one seal.

In another aspect, there is provided a method of sealing a fluid system in a safety condition comprising: sealing an annular gap defined between a periphery of a pipe and a periphery of an opening of a housing with at least one seal when a temperature surrounding the system is below a safety condition threshold temperature; thermally expanding the pipe at a first rate; thermally expanding the housing at a second rate, the second rate being lesser than the first rate; and closing the gap by thermal expansion of the pipe into sealing contact with the periphery of the pipe when the temperature surrounding the system reaches the safety condition threshold temperature.

In a further aspect, there is provided a gas turbine engine comprising: a transfer pipe defining a fluid passage, the pipe having a first rate of thermal expansion, a housing defining an opening for receiving an end of the pipe for fluid circulation between the fluid passage and an interior of the housing, the housing having a second rate of thermal expansion lesser than the first rate of thermal expansion, at least one annular gap being defined between a periphery of the opening and the end of the pipe when a temperature surrounding the system is below a safety condition threshold temperature, and at least one seal in the annular gap, wherein the pipe and the housing are configured and the first and second rates of thermal expansion are selected so that, when the system exceeds the safety condition threshold temperature, the end of the pipe contacts the periphery of the opening by thermal expansion to seal the annular gap independent of the at least one seal.

DESCRIPTION OF THE DRAWINGS

Reference is now made to the accompanying figures in which:

FIG. 1 is a schematic sectional view of a system for sealing a fluid system in a safety condition in accordance with the present disclosure;

FIG. 2 is a schematic sectional view of a system for sealing a fluid system in a safety condition in accordance with the present disclosure, with sacrificial material on a pipe; and FIG. 3 is a schematic sectional view of a system for sealing a fluid system in a safety condition in accordance with the present disclosure, with sacrificial material on a surface of an opening of a housing.

DETAILED DESCRIPTION

Referring to the figures and more particularly to FIG. 1, there is illustrated at 10 system found in engines, such as gas turbine engines, for fluid circulation. For example, the system 10 may be part of an oil system or fuel system, among possibilities. The system 10 comprises a pipe 20 (a.k.a., a tube, a transfer tube, a conduit, etc), a housing 30, and a seal 40 therebetween. The fluid circulates in the pipe 20 from or to the housing 30.

Referring to FIG. 1, the pipe 20 defines a fluid passage 21 open to a first end 22 of the pipe 20. Although not shown, the fluid passage 21 is open to a second end of the pipe 20, which second end is connected to a fluid source or destination. At the first end 22, the pipe 20 may have a greater thickness than at other axial locations along the pipe 20, although the thickness may be even or less. An annular channel or groove 23 may be defined in an outer periphery of the pipe 20, for receiving part of the seal 40 therein, although the housing 30 could also have an annular channel therein, instead or in supplement of the one in the pipe 20. The pipe 20 is configured to have a first rate of thermal expansion. The first rate of thermal expansion may be defined for instance by the type of material of the pipe 20, and its thickness.

The housing 30 many be any appropriate component of the engine that receives the end 22 of the pipe 20, for fluid to flow between the pipe 20 and the housing 30. For instance, the housing 30 may be part of a reservoir, casing, mounting pad, flange, feed through plate, etc. The system 10 may be implemented for various engine components which require fire compliance of a sealing interface.

The housing 30 defines a fluid cavity 31 in fluid communication with an opening 32 for receiving the end 22 of the pipe 20 for fluid circulation between the fluid passage 21 and an interior of the housing, i.e., the fluid cavity 31. The housing 30 is configured to have a second rate of thermal expansion. The second rate of thermal expansion may be defined for instance by the type of material of the housing 30, and its thickness. In particular, the second rate of thermal expansion, of the housing 30, is selected to be lesser than the first rate of thermal expansion, of the pipe 20.

An annular gap A is defined between a periphery of the opening 32 and the end 22 of the pipe 20. The annular gap A is sealed by the seal 40, which prevents or limits fluid leakage through the annular gap A. The seal 40 is made of any appropriate sealing material configured to withstand the normal operating conditions of an engine, include heat, pressure, exposure to oil, fuel, etc, i.e., when a temperature surrounding the system 10 is below a safety condition threshold. For example, the seal 40 may be preformed packing, or one or more polymeric seals.

The difference in rates of thermal expansion between the pipe 20 and the housing 30 are such that, when a safety condition threshold is reached, such as when a fire condition occurs in the environment of the system 10, the pipe 20 and the housing 30 are configured for a peripheral surface 22A of the end 22 of the pipe 20 (a.k.a., outer circumference) to contact the periphery 32A of the opening 32 (a.k.a., inner circumference) by thermal expansion and to seal the annular gap A when the temperature surrounding the system 10 reaches the safety condition threshold, e.g., when there is a fire condition.

In an embodiment, the concept being proposed is to select a material combination for the transfer pipe 20 and housing 30 with a large delta in thermal expansion. For example, the pipe 20 and the housing 30 may be made of metals (e.g., fire resistant grade) with different rates of thermal expansion, such that if the system 10 is exposed to elevated temperatures of a fire condition, the primary means of sealing would be the metal to metal contact between the pipe 20 and the housing 30 because the annular gap A would have been closed due to the relative thermal growth between the materials of the pipe 20 and housing 30. Therefore, during a fire condition the design will not rely on the seal 40 as a primary means of sealing for this configuration. The material combination and the annular gap A must be sized such that the material to material contact (e.g., metal to metal) only occurs during a fire condition, in order to minimize fretting during normal engine operation. In contrast, during normal engine operation the primary means of sealing is the seal 40.

Referring to FIGS. 2 and 3, the system 10 may comprise an annular layer of sacrificial coating 50 on one of the pipe 20 and the opening 32 of the housing 30, or both. The sacrificial coating 50 may be located inward of the seal 40 relative to the fluid cavity 31 of the housing 30. The sacrificial coating 50 may increase the sealing capacity of the system downstream of the seal 40, while the material to material contact between the pipe 20 and the housing 30 isolates the seal 40 upstream of it. The sacrificial coating 50 will be compressed by the thermal growth of the pipe 20 and housing 30 and for a liquid-tight sealing barrier adjacent to the material to material contact between the pipe 20 and the housing 30. For example, the sacrificial material 50 may be intumescent paint and/or intumescent dry coating selected to swell when the safety condition threshold is reached. In FIG. 2, the sacrificial material 50 is on the pipe 20. In FIG. 3, the sacrificial material 50 is on the periphery of the opening 32 of the housing 30. An annular clearance 33 may be provided to isolate the sacrificial material 50 from contact with the end 21 of the pipe 20 during assembly. In addition to the presence of the sacrificial coating 50, the pipe 20 and housing 30 may be arranged for an axial contact to occur at the safety condition. In such a case, the end surface 22B of the pipe 20 may contact a counterbore surface 32B of the opening 32 of the housing 30.

Therefore, the system 10 may operate a method of sealing a fluid system in a safety condition. The method may comprise sealing the annular gap A defined between the periphery 22 of the pipe 20 and the periphery of the opening 32 of the housing 30 with the seal 40 (one or more seals) when a temperature surrounding the system 10 is below a safety condition threshold, such as a fire condition. The pipe 20 thermally expands the pipe at a first rate. The housing 30 thermally expands at a second rate, the second rate being lesser than the first rate. The gap A is closed by thermal expansion of the pipe 20 into sealing contact with the periphery of the pipe 30 when the temperature surrounding the system reaches the safety condition threshold. Closing the gap A may comprise forming a metal-to-metal seal between the pipe 20 and the periphery of the opening 32. Closing the gap may comprise compressing the sacrificial material 50 between the pipe 20 and the periphery of the opening 32 to form a liquid-tight joint, or swelling of an intumescent paint and/or intumescent dry coating for example to seal the gap A at an axial location away from the material to material contact. Compressing the sacrificial material is performed inwardly of the seal 50 relative to an interior of the housing 30.

The above description is meant to be exemplary only, and one skilled in the art will recognize that changes may be made to the embodiments described without departing from the scope of the invention disclosed. For example, the system described above may be applied to a sensor or probe mating with a flange or housing including a preformed packing to seal fuel or oil, a fluid accessory such as a fuel control unit, propeller control unit, fuel oil heater exchange, flow divider valve, fuel or oil actuator mating with a flange, housing, casing or mounting pad also including a preformed packing to seal fuel or oil. Still other modifications which fall within the scope of the present invention will be apparent to those skilled in the art, in light of a review of this disclosure, and such modifications are intended to fall within the appended claims.

The invention claimed is:

1. A system comprising:
a pipe defining a fluid passage, the pipe having a first rate of thermal expansion,
a housing defining an opening for receiving an end of the pipe for fluid circulation between the fluid passage and an interior of the housing, the housing having a second rate of thermal expansion lesser than the first rate of thermal expansion, at least one annular gap defined between a periphery of the opening and the end of the pipe when the system is below a safety condition threshold temperature, and
at least one seal sealing the annular gap,
wherein the pipe and the housing are configured and the first and second rates of thermal expansion are selected so that, when the system exceeds the safety condition threshold temperature, the end of the pipe contacts the periphery of the opening by thermal expansion to seal the annular gap independent of the at least one seal.

2. The system according to claim 1, wherein the annular gap is defined between an outer circumference of the pipe and an inner circumference of the opening, and/or between an axial end of the pipe and a counterbore surface of the opening.

3. The system according to claim 1, wherein the pipe and the periphery of the housing are made of metal, for metal to metal contact in the safety condition.

4. The system according to claim 1, further comprising a layer of sacrificial material provided on at least one of the periphery of the opening and of the periphery of the end of the pipe and configured to form a sacrificial liquid-tight seal when the system exceeds the safety condition threshold temperature.

5. The system according to claim 4, wherein the sacrificial material is at least one of an intumescent paint and intumescent dry coating.

6. The system according to claim 4, wherein the sacrificial material is located inward of the at least one seal relative to an interior of the housing.

7. The system according to claim 6, wherein the layer of sacrificial material is provided on an annular clearance in the periphery of the opening.

8. The system according to claim 1, wherein the at least one seal is partially received in an annular groove in the periphery of one of the pipe and the opening of the housing.

9. A method of sealing a fluid system in a safety condition comprising:
sealing an annular gap defined between a periphery of a pipe and a periphery of an opening of a housing with at least one seal when a temperature surrounding the system is below a safety condition threshold temperature;
thermally expanding the pipe at a first rate;
thermally expanding the housing at a second rate, the second rate being lesser than the first rate; and
closing the gap by thermal expansion of the pipe into sealing contact with the periphery of the pipe when the temperature surrounding the system reaches the safety condition threshold temperature.

10. The method according to claim 9, wherein closing the gap comprises forming a metal-to-metal seal between the pipe and the periphery of the opening.

11. The method according to claim 9, wherein closing the gap comprises compressing a sacrificial material between the pipe and the periphery of the opening to form a liquid-tight joint.

12. The method according to claim 9, wherein closing the gap comprises swelling a sacrificial material being at least one of an intumescent paint and intumescent dry coating.

13. The method according to claim 11, wherein compressing the sacrificial material comprises compressing the sacrificial material inwardly of the at least one seal relative to an interior of the housing.

14. The method according to claim 9, wherein closing the gap comprises closing the gap by at least one of a radial contact and an axial contact between the periphery of the pipe and the periphery of the opening of the housing.

15. A gas turbine engine comprising:
a transfer pipe defining a fluid passage, the pipe having a first rate of thermal expansion,
a housing defining an opening for receiving an end of the pipe for fluid circulation between the fluid passage and an interior of the housing, the housing having a second rate of thermal expansion lesser than the first rate of thermal expansion, at least one annular gap being defined between a periphery of the opening and the end of the pipe when a temperature surrounding the system is below a safety condition threshold temperature, and
at least one seal in the annular gap,
wherein the pipe and the housing are configured and the first and second rates of thermal expansion are selected so that, when the system exceeds the safety condition threshold temperature, the end of the pipe contacts the periphery of the opening by thermal expansion to seal the annular gap independent of the at least one seal.

16. The gas turbine engine according to claim 15, wherein the pipe and the periphery of the housing are made of metal, for metal to metal contact in the safety condition.

17. The gas turbine engine according to claim 15, further comprising a layer of sacrificial material provided on at least one of the periphery of the opening and of the periphery of the end of the pipe and configured to form a sacrificial liquid-tight seal in the safety condition.

18. The gas turbine engine according to claim 17, wherein the sacrificial material is located inward of the at least one seal relative to an interior of the housing.

19. The gas turbine engine according to claim 18, wherein the layer of sacrificial material is provided on an annular clearance in the periphery of the opening.

20. The system according to claim 1, wherein the end of the pipe contacts the periphery of the opening by thermal expansion to seal the annular gap independent of the at least one seal, and a layer of sacrificial material forms a sacrificial liquid-tight seal between the end of the pipe contacts the periphery of the opening.

* * * * *